3,790,672
METHOD FOR ACTIVATING BLOOD FIBRINOLYSIS BY ADMINISTRATION OF A SALT OF 2-AMINO-ETHANESULPHONIC ACID

Alberto Giotti, 15 Via Trento, and Federigo Sicuteri, 36 Pizza, d'Azeglio, both of Firenze, Italy
Continuation-in-part of application Ser. No. 28,588, Apr. 15, 1970, now Patent No. 3,725,553. This application Mar. 21, 1973, Ser. No. 343,475
Claims priority, application Italy, Feb. 23, 1970, 48,769/70
Int. Cl. A61k 27/00
U.S. Cl. 424—248       5 Claims

ABSTRACT OF THE DISCLOSURE

A method for activating the fibrinolysis of blood by administration of a composition containing an organic salt of 2-amino-ethanesulphonic acid and a pharaceutical carrier therefore. The salts are those of pharmaceutically acceptable organic bases such as diethylamine and morpholine.

---

Figure 1:
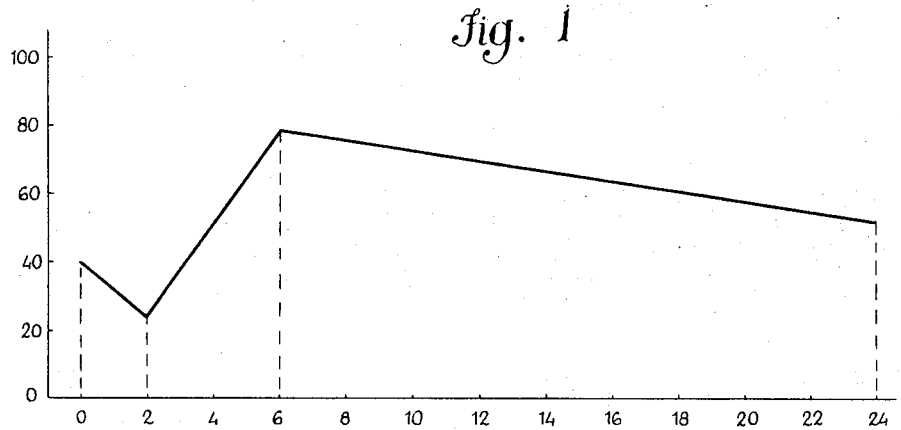

This application is a continuation-in-part of Ser. No. 28,588, filed April 15, 1970 now U.S. Pat. No. 3,725,553.

The present invention relates to a method for activating the fibrinolysis of the blood by administration of organic salts of 2-amino-ethanesulphonic acid (Taurine).

More particularly, this invention relates to the administration of salts of taurine by oral or venous route in dosages later on described, in order to stimuate the fibrinolytic-thrombolytic activity of the blood, particularly in angiopathic subjects.

It is known that heart and limb diseases particularly angina pectoris and claudicatio intermittens, can be suitably treated by preparations having a specific vasodilating action (the so-called vasodilators and particularly the coronary dilating agents) or by preparations having no specific action of this kind on the vases. In both cases the action mechanism has not been rendered clear. For the vasoactive drugs, discussion concerns the possibility that a vasodilating action will improved the blood supply to the tissues, while for the non-vasodilating drugs it is admitted that the action will be carried out at the tissue level, modifying in certain modes the metabolism and the request for oxygen, as has been observed by F. Sicuteri and A. Giotti in "Perspectives in the Field of Antianginal Non-Coronary Dilating Agents" in Circulatory Drugs, North Holland Publ. Co., Amsterdam, 1969.

Also the pyrotherapy proves to be particularly useful in the ischemic diseases of the arts and viscerae. The mechanism has been referred first to vasodilating which accompanies the hyperpyrexy. On the other hand it has been observed that also in nonfebrific dosages clinic replies are obtained, as well as leukocytic and enzymatic movements, and particularly an increase of the fibrinolysis and of the betaglucoronidase, an enzyme having a predominantly lysosomial origin. [See A. Bevazzano, M. Fancilullacci, F. Sicuteri "Effect of the Endotoxins in Sub-Febrific Dosages on Some Plasmatic, Enzymatic Levels (Betaglucoronidase, Acid Phosphotase) and on the Diuresis of the Man" in Boll. Soc. Ital. Sper., 43, 1403, 1967].

A nondilatating drug having a beneficial action in the angina pectoris F. Sicuteri, G. Franchi, A. Giotti, A. Guidotti, "On the Antianginal Action of a Non-Coronary Dilating Sulphurated Aminoacid," Clinica Terap. 49, 205, 1969 and "Taurine as a Therapeutic Agent in Vascular Pain (Angina Pectoris and Claudicatio Intermittens)," Clinical Medicine, which is now being printed], in myocardial infarction (F. De Rango, P. Del Corso, "Electrocardiographic Modifications Induced by Taurine in the Coronary Cardiodiseases," Rec. Progr. Med., 44, 19, 1968), as well as in the claudicatio intermitten (U. Becattini, "Perspectives of a Novel Drug in the Therapy of the Vasculopathies: Taurine," Sett. Med., 55, 1355, 1967) is a sulphonated aminoacid, and particularly 2-amino-ethanesulphonic acid (taurine). The biologic features and pharmaceutical properties of this drug have been discussed by J. G. Jacobsen and L. H. Smith, "Biochemistry and Physiology of Taurine and Taurine Derivatives," Physiol. Rev., 48, 424, 1968 and A. Guidotti and A. Giotti, "Taurine and Cardiovascular System," Rec. Progr. in Medicina, 49, 61, 1970.

While the action mechanism of this preparation is not clear, the possibility has been admitted of a greater utilization of oxygen at the tissular level (U. Becattini, G. Cangi, G. Gabrielli, S. Citi, L. Loddi, "La Determination Continue de la Saturation en Oxygen et du Contenu en $CO_2$ Dans le Sang in Vivo," Bull. Phys. Resp., 2, 289, 1966) or with an indirectly competitive mechanism on the metabolic actions of adrenalin.

As the fibrinolytic drugs (pyrogens, oral antidiabetics, nicotinic acid) have a certain efficiency on the ischemic diseases, and as information in this connection is not found in the literature, it has been found, according to this invention, after testing the possible actions of taurine on the fibrinolytic homeostasis, that organic salts of taurine develop an intense fibrinolytic action. Furthermore, the salts of taurine with organic bases such as diethylamine and morpholine develop strong fibrinolytic action.

Particularly, it has been experimentally ascertained that while 2-amino-ethanesulphonic acid is not active at the hematic level, where indeed, at high concentrations in vitro or soon after a venous administration it inhibits fibrinolysis, it causes a certain latency after the initial period of high plasmatic concentration, at the moment when its passage in the tissues occurs, and a durable and relevant increase of the fibrinolytic activity occurs. This feature of taurine, and particularly of the activation of the fibrinolysis practically obtainable, permits its use for fibrinolytic-thrombolytic purposes.

It must also be noted that taurine is a sulphurated aminoacid biologically present in the human organism and is very well tolerated if administered either by oral or venous route.

Accordingly, a specific object of the present invention is a method for activating the fibrinolysis of blood by administration of organic salts of 2-amino-ethanesulphonic acid by an oral or venous route. Now, particular reference is made to taurine.

In case taurine administration will be carried out by phleboclysis, the preferred dosage is 2 grams of taurine, administered in subsequent fractions of 10 mg./min.

On the contrary, when the administration is carried out orally, the preferred dosage is 2 grams each 8 hours, through a total of 24 hours.

The present invention will now be described more in detail with reference to the following clinic experiments. The tests were carried out on a total of 18 subjects from the Medical Clinic of the University of Florence, including both angiopathic subjects and patients free from present cardiocirculatory diseases.

The 18 subjects were subdivided into three groups as follows:

Group A: 8 subjects
Group B: 5 subjects
Group C: 5 subjects.

Administration of taurine intravenously

In the morning, from the subjects (8) of Group A, fast from 12 hours and in a horizontal position for at least 2 hours, were drawn, avoiding any stasis, two amounts of 4 cc. each of citrated venous blood, from a surface vein of the elbow. To these subjects taurine was then administered (taurine for venous use was supplied by the Instituto Farmochimico Falorni-Florence) by phlebocylsis at the dosage of 100 mg./min. up to a total of 2 grms. Then other amounts of 4 cc. each of citrated blood were drawn at the end of the phlebocylsis, after 2 hours, 6 hours and 24 hours. On the specimens of obtained blood the fibrinolytic activity was determined on the whole blood, which has been diluted and instantaneously coagulated with thrombin (see G. R. Fearuley, "Fibrinolysis," Edward Arnold Pub., London, 1965), using the modification of metering the hemoglobin of the red corpuscles rendered free from the coagulum in a fixed incubation time (see, for instance, L. Andreotti and G. Nuzzani, "Evaluation of the Fibrinolytic Activity in the Human Blood," Riv. Crit. Clin. Medica, 64, 1967, 1964), improved by metering the coagulum of whole diluted citrated blood in a fixed incubation time of 2 hours (see, for instance, Astrupt Abet, "Activator of Bovin Plasminogen, by the Plasminogen Activator in Animal Tissue," Thrombos. Diathes Haemorrh., 4, 201, 1960 and A. G. Dottori and O. Ponari "The Fibrinolysis," Ed. Min. Med. Torino, 1964). As if the rate of fibrinogen in the blood is very scarce, the blood can be practically non-coagulable and therefore it is possible to have a wrong evaluation of the lysis. In the examined subjects the fibrinogenhemia has been always dosed, and said fibrinogenheima appeared always to have such a value as to ensure a normal coagulation, i.e. greater than 340 mgr./100 cc. of plasma.

Administration of taurine by the oral route

The administration was carried out on the subjects (5) of the Group B. In these subjects, in the morning, fast since 12 hours and in a horizontal position since at least 2 hours, was determined the fibrinolytic activity of the whole blood with the above cited method. Subsequently, taurine was administrated orally in the dosage of 2 grms. every 8 hours. After 24 hours in the same circumstances wherein the spontaneous fibrinolytic activity has been determined, the fibrinolytic activity was metered again on the whole blood.

Tests in vitro

In the subjects of the Group C (5) the spontaneous fibrinolytic activity is determined. Simultaneously on an analogous blood sample the action of taurine in vitro is tested at the dosage of 12.5 mgr./cc. of diluted whole blood.

The results of the test carried out on the subjects of the Groups A and B have been summarized as follows with particular reference to the drawings (FIGS. 1 and 2), where diagrams have been reported supplying (on the vertical axis) the percent of fibrinolysis obtained versus the time (axis of the abscissae) metered starting from the termination of the taurine administration.

Figure 2:
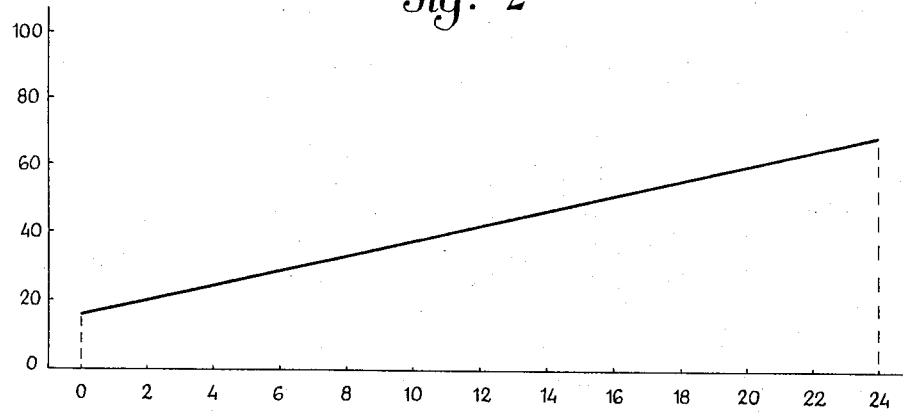

The dosages are those already specified for the Groups A and B to which the FIGS. 1 and 2 relate, respectively.

With particular reference to Group A, soon after phlebocylsis the fibrinolytic activity of the entire blood diminishes, continuing its decrease until the second hour from the substance administration. At the sixth hour it increases from the base average value 40.8% to an average value 79.3% to come back, after 24 hours, to the basic value (see FIG. 1).

In the subjects of Group B to whom taurine has been administered orally, after 24 hours an increase of the fibrinolytic activity was observed in the blood passing from an average value of 16% to an average value of 67.4% (see FIG. 2).

In cases where the fibrinolytic activity of the taurine in vitro has been tested (Group C) not only is there an absence of any activation, but also at the dosages used a block of the fibrinolytic activity of the whole blood passes from an average basic value of 40% to an average value of 11.6%.

From the above related results it is possible to conclude that taurine acts on the fibrinolysis in two opposite directions. Thus, when infused by the venous route so that high concentrations of the sulphurated aminoacid are reached in the blood, there is in the first hours, subsequent to infusion, an inhibition of the fibrinolytic activity. This data is in conformity with the inhibition of the plasminogen-plasmin system which is obtained by incubating taurine with whole blood in vitro.

After the initial period of high plasmatic concentration, at the moment when the taurine tends to pass into the tissues, a relevant and extended increase of the fibrinolytic activity will be noted. This behavior of the fibrinolysis suggests the hypothesis that the taurine will act on the fibrinolysis not at a plasmatic level, but at a tissular level, rendering free kinase or promoting the action of the tissular activator. If the possibility of an action is admitted on the plasminogen-plasmin starting from the tissues, the hypothesis of mobilization of the tissular activator is the most reliable, since as stated above, the fibrinolytic activity of the sulphurated amine is slow to start and lasts through a rather long time. The action of the plasminogen-plasmin system of the tissular activators released by taurine is definitely slower than that of the plasmatic activators stimulated by streptokinase and urokinase, being that the action of the plasmatic activators is grounded on a stoichiometric ratio reaction. Also in favor of a possibility of action of the sulphurated amine at the tissular level can be considered the fact that the taurine has a high proper tropism for those tissues (see J. Awapara, "Aminoacids Pools," J. T. Holden Edition, Elsevier Publ., Amsterdam, 1962, p. 158) which have the highest activator contents (see O. K. Albrechtsen, "Fabrinolytic Activity of Human Tissues," Brit. Haemat., 3, 284, 1957).

Apart from this hypothesis, which relates to the pharmacologic mechanism, the practical aspect remains of the importance of the fibrinolytic power of the amine. In other words by this sulphurated aminoacid a substance is supplied, biologically present in the human organism, excellently tolerated, and capable, if administered orally or intravenously, of activating the fibrinolysis with such an activity as to be utilized for therapeutic purposes.

The following will illustrate the preparation of the organic salts of taurine, it being understood that the salts can be administered in the same manner and dosages as the taurine itself.

EXAMPLE 1

Preparation of salt of taurine and diethylamine 0.1 mol (7.314 g.) of pure, freshly distilled diethylamine is diluted with 25 ml. of distilled water. To this solution there is added 0.1 mol (12.514 g.) of taurine with stirring until complete dissolution thereof results.

The solution of the obtained salt has a pH value of $10 \pm 0.1$ and a concentration of about 46.6%, corresponding to a concentration of taurine of 29.4%.

Thus, the salt has a solubility in water 6 to 7 times greater than that of taurine, the water solubility of which is about 7%. By the use of this salt, it is therefore possible to administer, at equal volume, doses of taurine 4 times higher than those possible when solutions of taurine are administered.

EXAMPLE 2

Preparation of salt of taurine and morpholine 0.1 mol (8.712 g.) of pure morpholine is diluted with 75 ml. of distilled water. To this solution there is added 0.1 mol (12.514 g.) of taurine, with stirring until complete dissolution thereof results.

The solution of the obtained salt has a pH value of $9 \pm 0.1$ and a concentration of about 22.9%, equal to 13.5% of taurine.

Thus, the salt has a solubility in water 3 times greater than that of taurine, the water solubility of which is about 7%. By the use of this salt, there may be administered at equal volume, doses of taurine twice as high as those possible when solutions of taurine are administered.

What we claim is:

1. A method for inducing fibrinolysis of blood in a patient requiring such inducement comprising orally or intravenously administering to said patient an effective fibrinolysis-inducing amount of a composition containing a pharmaceutically acceptable salt of 2-amino-ethanesulphonic acid with an organic base selected from the group consisting of morpholine and diethylamine as active ingredient, and a pharmaceutically acceptable carrier therefor.

2. The method according to claim 1, wherein the composition is administered intravenously in subsequent dosages of 100 mg./min. of active ingredient until a total dosage of 2 grams of active ingredient has been administered.

3. The method according to claim 1, wherein the composition is administered orally in subsequent dosages of 2 grams of active ingredient each 8 hours for a total of 24 hours.

4. The method according to claim 1, wherein the organic base is diethylamine.

5. The method according to claim 1, wherein the organic base is morpholine.

References Cited

Chemical Abstracts, 30: 8399 (1936).
Chemical Abstracts 47: 6098h (1953).
Jacobsen et al., Physiol. Reviews, vol. 48, No. 2 (1968), pp. 464–65, 485–86, 491.

ALBERT T. MEYERS, Primary Examiner

N. A. DREZIN, Assistant Examiner

U.S. Cl. X.R.

424—315